United States Patent [19]

Hartley

[11] Patent Number: 6,007,309
[45] Date of Patent: Dec. 28, 1999

[54] MICROMACHINED PERISTALTIC PUMPS

[76] Inventor: Frank T. Hartley, 529 E. Las Flores Ave., Arcadia, Calif. 91006

[*] Notice: This patent is subject to a terminal disclaimer.

[21] Appl. No.: 08/986,363

[22] Filed: Dec. 8, 1997

Related U.S. Application Data

[63] Continuation-in-part of application No. 08/572,186, Dec. 13, 1995, Pat. No. 5,705,018.

[51] Int. Cl.$^6$ .................................................... F04B 17/00
[52] U.S. Cl. ................... 417/322; 417/413.1; 417/413.3; 417/474
[58] Field of Search ....................................... 417/472, 473, 417/474, 475, 322, 413.1, 413.3

[56] References Cited

U.S. PATENT DOCUMENTS

| | | | |
|---|---|---|---|
| 4,115,036 | 9/1978 | Paterson | 417/322 |
| 4,498,850 | 2/1985 | Perlov | 417/322 |
| 4,697,989 | 10/1987 | Perlov | 417/53 |
| 4,794,370 | 12/1988 | Simpson et al. | |
| 5,040,955 | 8/1991 | Knutsen | 417/474 |
| 5,096,388 | 3/1992 | Weinberg | 417/322 |
| 5,380,396 | 1/1995 | Shikida et al. | |
| 5,585,011 | 12/1996 | Saaski et al. | |
| 5,725,363 | 3/1998 | Bustgens et al. | 417/413.1 |
| 5,836,750 | 11/1998 | Cabuz | 417/322 |

OTHER PUBLICATIONS

Preprint of "Design, Fabrication & Testing of a Miniature Peristaltic Membrane Pump," by James A. Folta et al., Apr. 1992, prepared for Proceedings of the IEEE Solid State Sensor and Actuator Workshop, Hilton Head Island, South Carolina, held Jun. 21–25, 1992.

"Design, Fabrication & Testing of a Miniature Peristaltic Membrane Pump," by James A. Folta et al., pp. 186–189, Apr. 1992, Lawrence Livermore National Laboratory, California.

"A Piezo–Electric Pump Driven by a Flexural Progressive Wave," pp. 110–113, by Shun–ichi Miyazaki et al., Seventh International Conference on Solid State Sensors and Actuators, held at Yokohama, Japan, on Jun. 7–10, 1993.

"A Novel Piezoelectric Valve–Less Fluid Pump," by Erik Stemme et al., 7th International Conference on Solid State Sensors & Actuators, pp. 110–113, Yokohama, Japan, Jun. 7–10, 1993.

"Performance Simulation of Microminiaturized Membrane Pumps," by R. Zengerle, et al., Fraunhofer Institute for Solid State Technology, Munich, Germany.

"Peristaltic Pumping," by M.Y. Jaffrin et al., 1971, Department of Mechanical Engineering, Institute of Technology, Cambridge, Massachusetts.

"Piezoelectric Micropump with Three Valves Working Peristaltically," by Jan G. Smist, Sensors and Actuators (1990), pp. 203–206.

"A Micro Membrane Pump with Electrostatic Actuation," by R. Zengerle et al., Micro Electro Mechanical Systems '92, Travemunde, Germany, Feb. 4–7, 1992.

"Electrohydrodynamic Pumping and Flow Measurement," by A. Richter et al., pp. 271–276, Proceedings of the IEEE Micro Electro Mechanical Systems, Application of Micro Structure, Sensors, Actuators, Machines and Robots, Nara, Japan, Jan. 30–Feb. 2, 1992, New York, New York, U.S.A., IEEE 1991.

"Dialog Search Abstract," date Oct. 12, 1995, pp. 1–8.
"Dialog Search Abstract," date Oct., 1995.

*Primary Examiner*—Timothy S. Thorpe
*Assistant Examiner*—Ehud Gartenberg
*Attorney, Agent, or Firm*—Price, Gess & Ubell

[57] ABSTRACT

Micromachined pumps including a channel formed between a first membrane and a substrate or between first and second flexible membranes. A series of electrically conductive strips is applied to a surface of the substrate or one of the membranes. Application of a sequential voltage to the series of strips causes a region of closure to progress down the channel to achieve a pumping action.

37 Claims, 10 Drawing Sheets

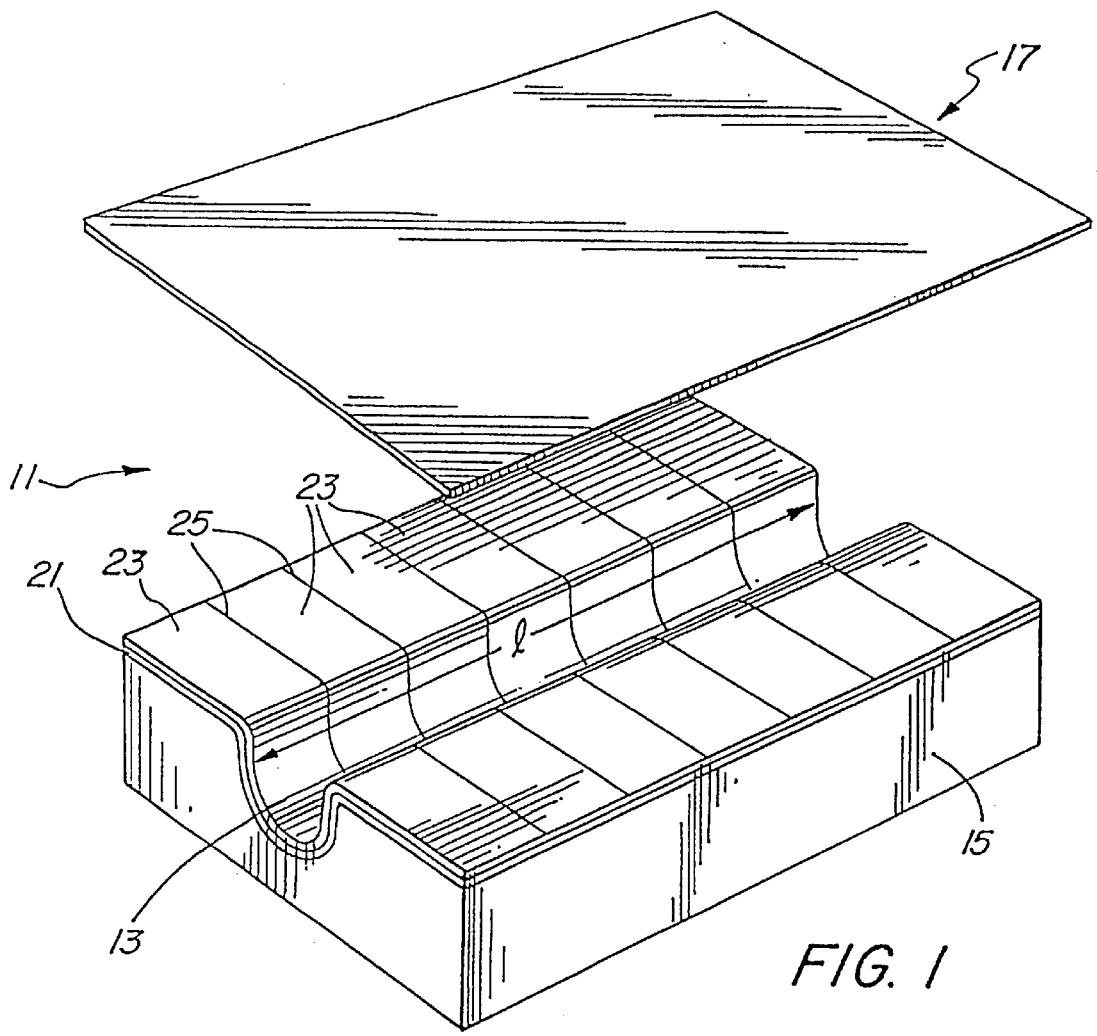
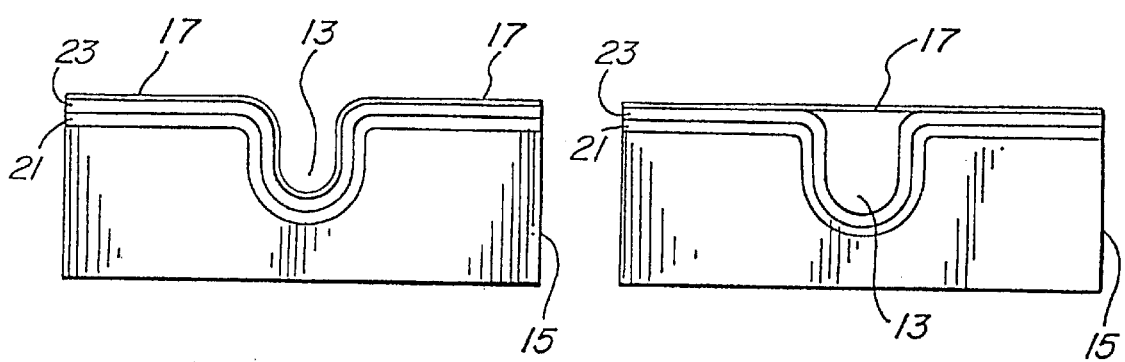

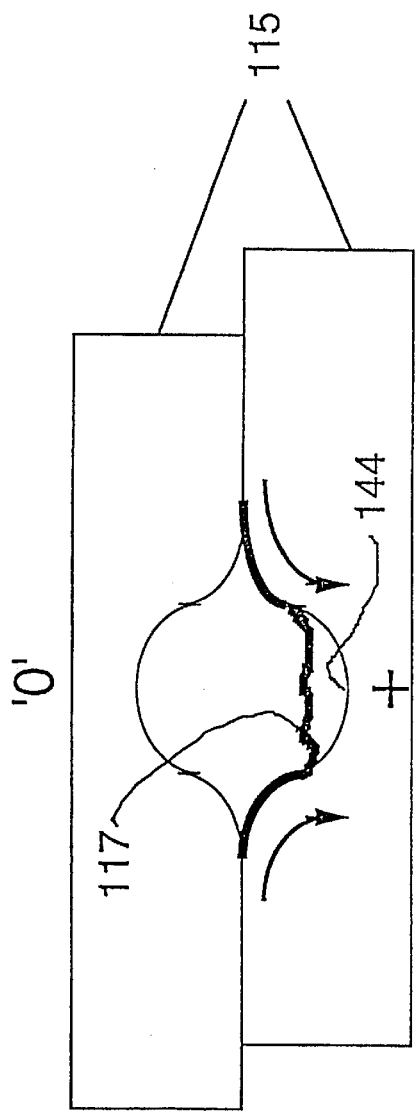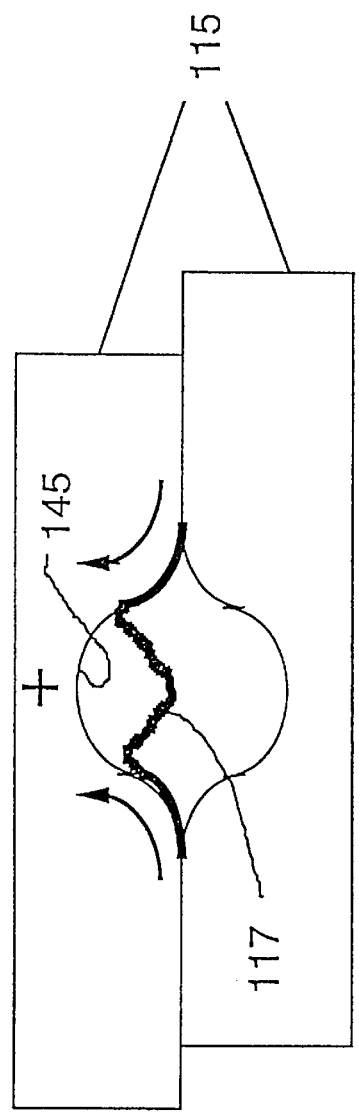

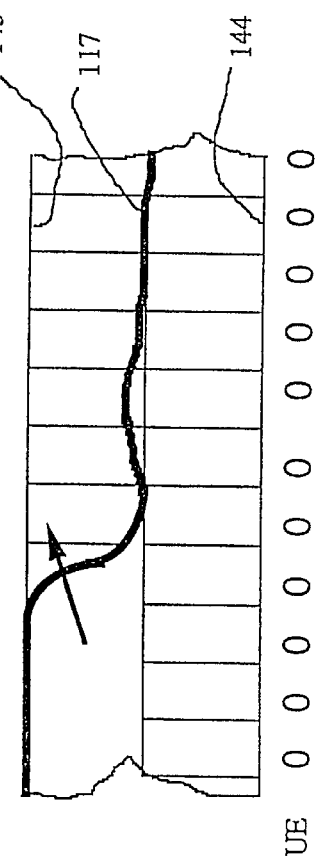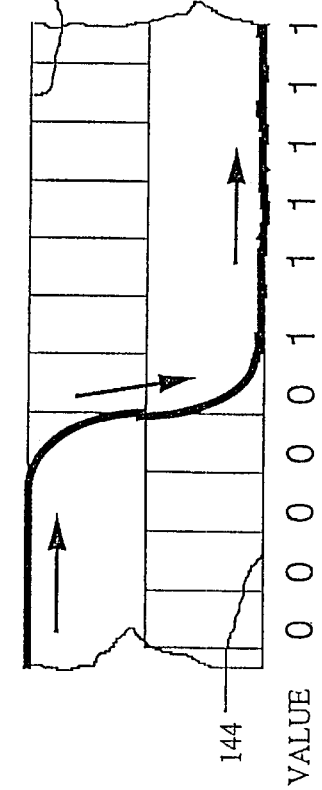

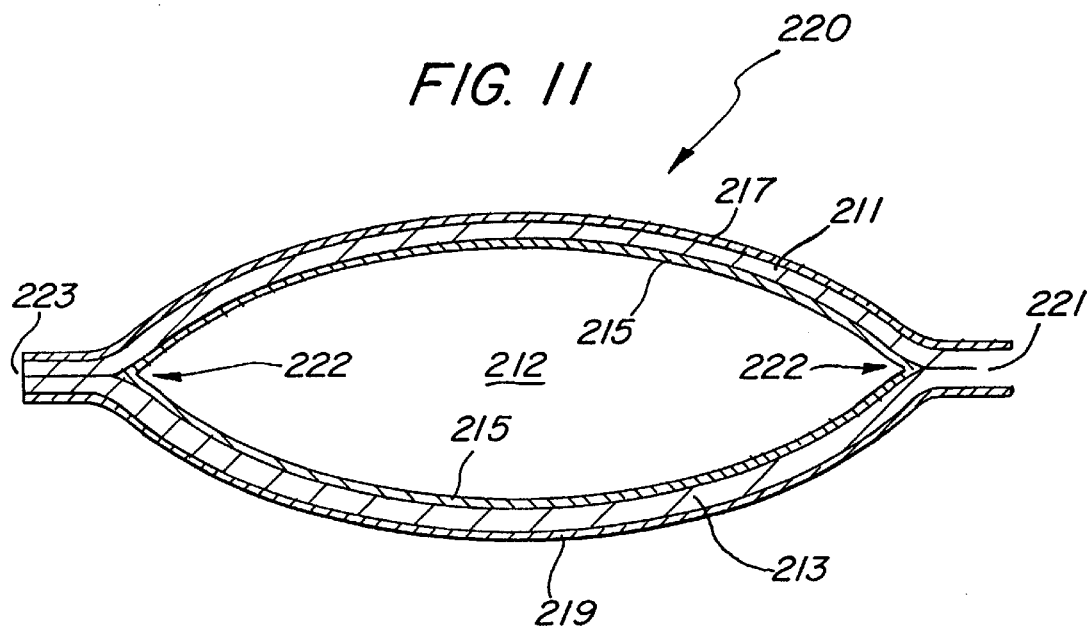
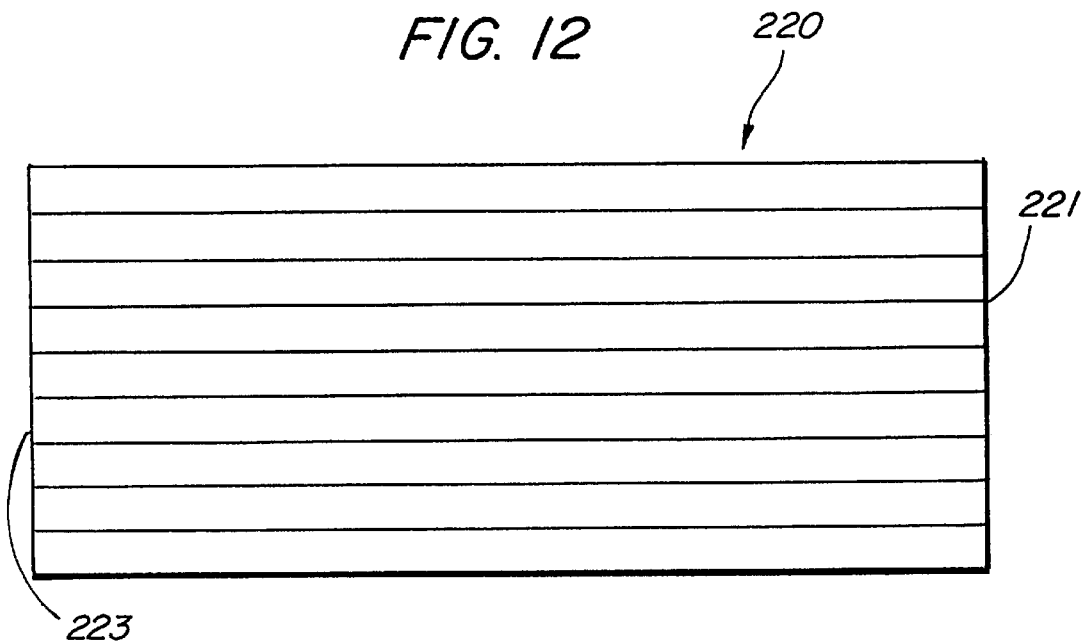

MICROMACHINED PERISTALTIC PUMPS

This application is a continuation-in-part of U.S. patent application Ser. No. 08/512,186, filed Dec. 13, 1995 now U.S. Pat. No. 5,705,018.

This invention was made with Government support under Contract No. NAS7-918 awarded by NASA. The Government has certain rights in this invention.

BACKGROUND OF THE INVENTION

1. Field of the Invention

The subject invention relates generally to pumps and, more particularly, to a method and apparatus for microscopic scale pumping of a fluid employing a micromachined electrostatic pumping device.

2. Description of Related Art

As reported in the article "Peristaltic Pumping" by M. Y. Jaffrin and A. H. Shapiro (1971), peristaltic pumping is a form of fluid transport that occurs when a progressive wave of area contraction or expansion propagates along the length of a distensible tube containing a liquid. Physiologically, peristaltic action is an inherent neuromuscular property of any tubular smooth muscle structure. This characteristic is put to use by the body to propel or to mix the contents of a tube, as in the ureters, the gastrointestinal tract, the bile duct, and other glandular ducts.

Peristalsis is also the mechanism by which roller or finger pumps operate. Here the tube is passive, but is compressed by rotating rollers, by a series of mechanical fingers, or by a nutating plate. These devices are used to pump blood, slurries, corrosive fluids, and foods, whenever it is desirable to prevent the transported fluid from coming into contact with the mechanical parts of the pump. Generally the compression mechanism occludes the tube completely or almost completely, and the pump, by positive displacement, "milks" the fluid through the tube.

While the prior art has addressed various small electrostatic or piezo-driven pumps, no truly microperistaltic-type pump has been provided. Prior art proposals include devices employing triple chambers with valving, typically implemented with piezo devices. Such systems are not truly peristaltic.

OBJECTS AND SUMMARY OF THE INVENTION

It is therefore an object of the invention to provide a miniature pump;

It is another object of the invention to provide a miniature pump fabricated by micromachining techniques which are applicable to various substrates and especially those used in semiconductor fabrication; and It is another object of the invention to provide micromachined pumps which exhibit true peristaltic action.

These and other objects and advantages are achieved according to the invention by provision of a flexible membrane, means attached to said membrane for forming a fluid-tight channel therewith, and means for attracting said membrane into said channel so as to close a region of said channel and for causing the region of closure of the channel to move down the channel so as to create a pumping action. A particular embodiment disclosed herein includes first and second flexible membranes attached together to from a flexible tube. Application of a sequential voltage to a series of conductor strips formed on one of the membranes pulls that membrane into the channel portion beneath each successive strip to achieve a pumping action.

The invention provides a method and apparatus for microscopic scale pumping of a liquid or vapor fluid. The submicron precision with which micromachining can define structural dimensions and with which etch stops can regulate layer thickness enables the fabrication of minutely scaled structures in which significant and reproducible electrostatic fields are generated by low voltages. Additionally, the invention provides a method of facilitating significant convective heat flux by the forced flow of fluids through microchannels within a solid, as well as many other advantageous applications described in application Ser. No. 08/512,816 incorporated herein by reference.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIG. 1 is a perspective view of a micromachined pump according to a first preferred embodiment;

FIG. 2 is a cross-sectional view of the device of FIG. 1 with voltage applied;

FIG. 3 is a cross-sectional view of the device of FIG. 1 with no voltage applied;

FIGS. 6 and 7 are schematic end views illustrating the operation of a push-pull pump according to the second preferred embodiment;

FIGS. 8 and 9 are partial side cross-sectional views illustrating sequential application of electrical signals down the channel of a micropump device according to the first and second preferred embodiments, respectively;

FIG. 11 is a schematic cross-sectional view of a flexible tube pump embodiment according to the invention;

FIG. 12 is a top view of the embodiment of FIG. 11;

DETAILED DESCRIPTION OF THE PREFERRED EMBODIMENTS

Figure 4:
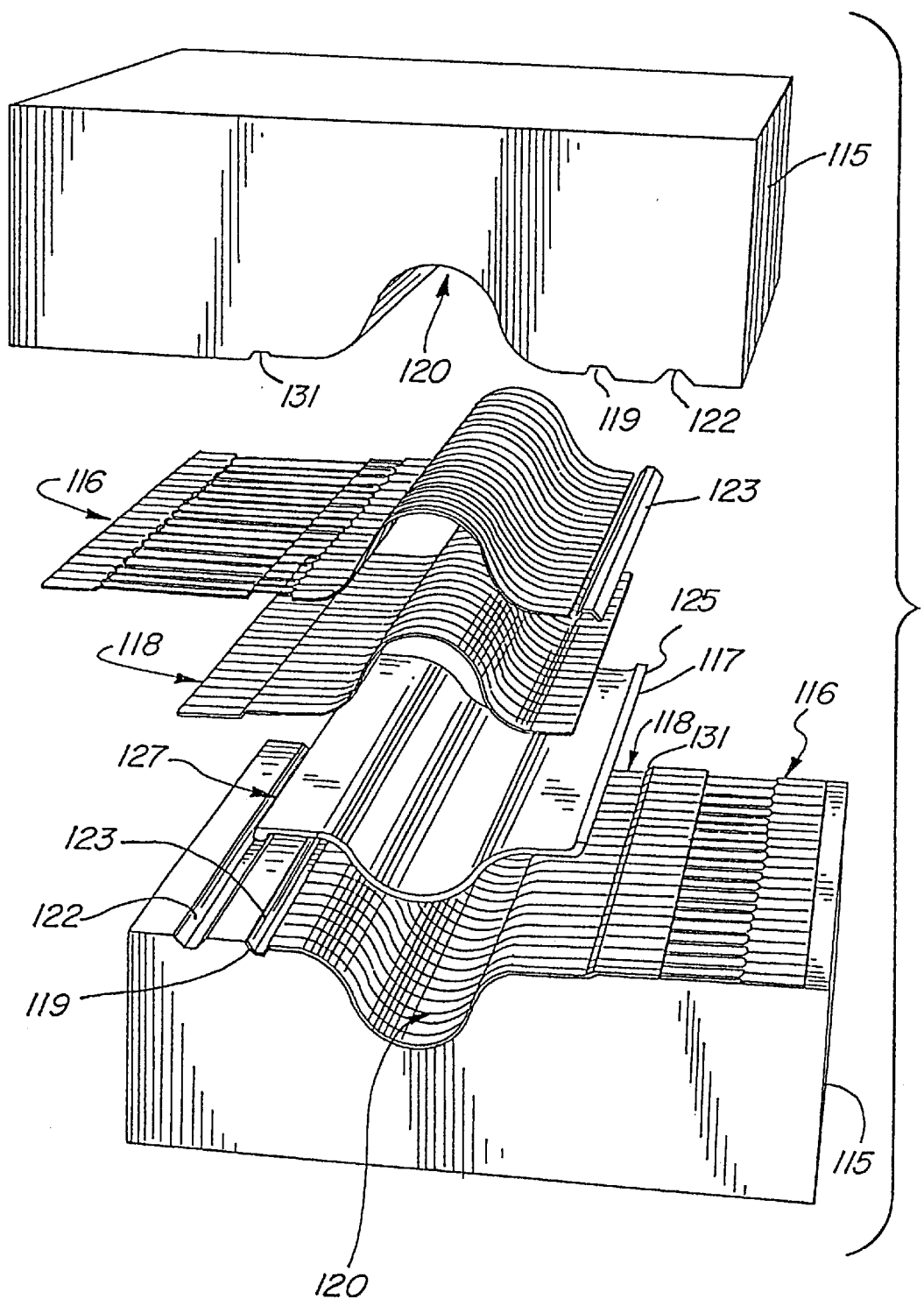
FIG. 4 is an exploded perspective view of a dual channel micropump according to a second preferred embodiment.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a particularly useful and widely applicable micropump structure.

FIG. 1 illustrates one embodiment of an electrostatically driven peristaltic pump according to the present invention. A pump channel 13 is etched into a silicon substrate 15, lined with electrically conductive strips 21 whose top surfaces are covered with electrically insulating material 23. The strips 21 are separated from each other by electrically insulating barriers 25 formed transverse to the channel 13. The channel 13 is then covered by an electrically conductive flexible membrane 17.

With no voltage applied, the membrane 17 is linear in cross-section and lies over the channel 13, as shown in FIG. 3. By applying a suitable voltage between the membrane 17 and each of the conductive strips 21 in succession, the membrane 17 can be electrostatically pulled into the channel 13, as shown in FIG. 2, at successive positions along the length "l" of the channel 13, thereby creating a peristaltic pumping action.

The characteristics and performance of the disclosed electrostatic actuated peristaltic pumps are principally dependent on the properties of the flexible membrane 17, which may exhibit an elasticity of about 30%. For low differential pressures and moderate temperatures a graphite impregnated polyurethane membrane material of thickness 5 $\mu$m is satisfactory. In vacuum applications, surface metallization of polyurethane membranes is necessary to reduce porosity. Higher voltages, such as 100 volts, are required to generate the electrostatic forces necessary to overcome the larger differential pressures, and high progression rates (500 m/sec) are required to pump nonviscous gases (vacuum pressures).

Figure 5:
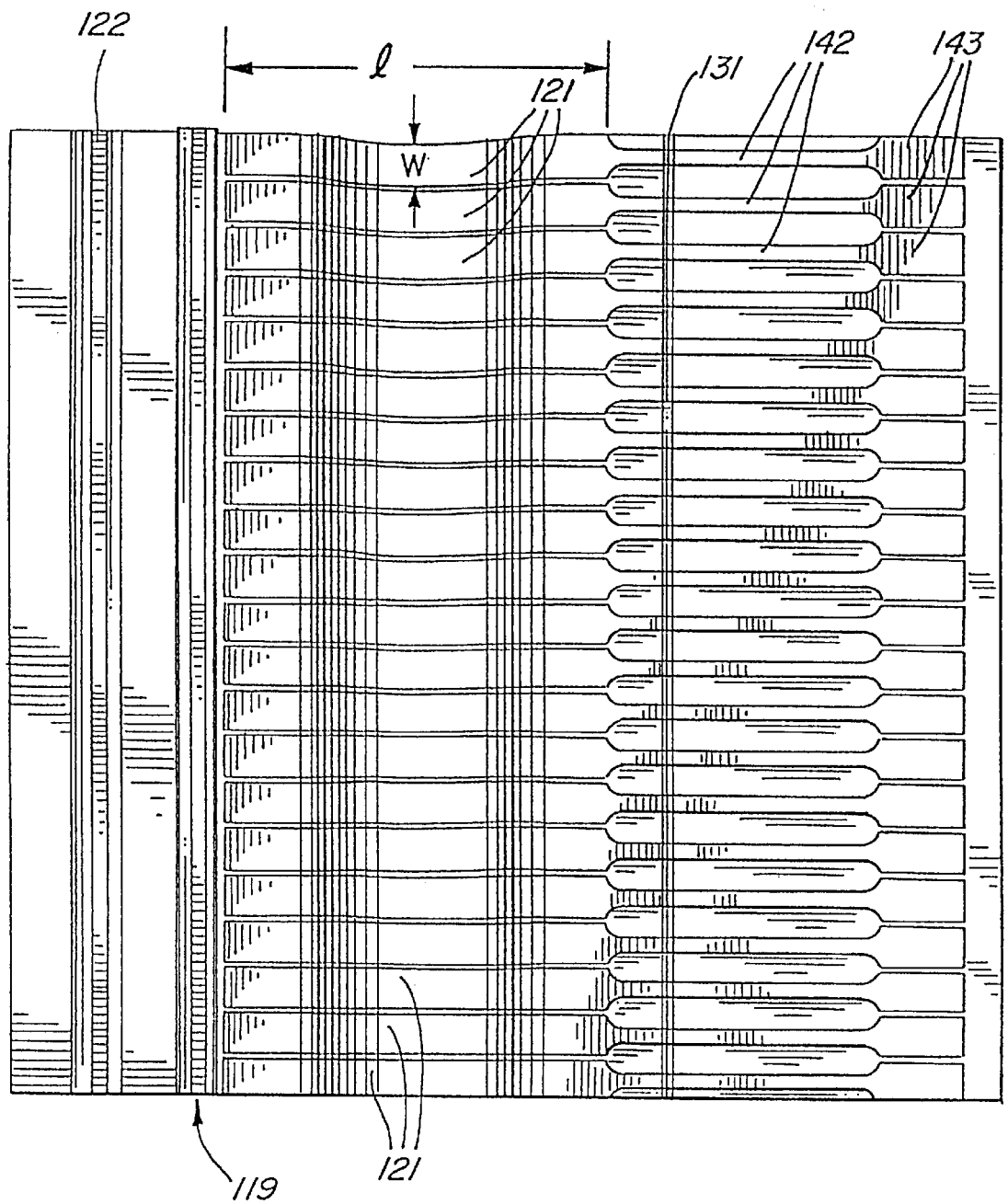
FIG. 5 is a top view of a conductive strip layer of a micropump according to FIG. 4.

FIGS. 4 and 5 illustrate the preferred push-pull dual cavity embodiment of a microperistaltic pump, where two silicon substrates 115 are placed together with a single membrane 117 sandwiched between them. The membrane 117 may again be graphite impregnated polyurethane. Between the membrane 117 and each substrate 115 are positioned respective conductive strip layers 116 and respective insulating layers 118. Each substrate 115 further has a linear conductor pit 119 and a bond metal trench 122 located adjacent one another and running parallel to a channel 120. While the thickness of the insulation layer 118 must be of submicron dimensions to ensure high electrostatic forces on the membrane 117, the channels 120 may be of millimeter dimensions.

A conductive strip layer 116 is shown in more detail in FIG. 5. The strip layer includes a number of actuator strip elements 121 which begin at the top edge of the channel 120 and traverse down the channel 120 and up the channel to its opposite edge. Thus, the substrate top surface curves down on either side to form a walled channel 120 having a radiused, concave, or rounded bottom portion such that no sharp edges are involved. The actuator strips 121 are rectangular conductor elements lying parallel to one another, transversely to the channel 120 and laid out down the length of the channel 120. They may be, for example, 0.1 millimeter in width "w" such that a group of 200 strips occupies about 20 millimeters. The space between the elements 121 is filled with insulation provided by an insulating layer 118 to provide interstrip insulation which insulates each actuator element 121 from the next element 121. Thinner lead elements 142 lead away from each actuator element 121 to a respective conductive pad 143, which provides a wire bond pad for establishing electrical connection to a shift register or other electronic componentry. The actuator strips 121, leads 142, and pads 143 are preferably formed by etching a single deposited conductive metal layer such as a gold layer.

Each conductor pit 119 has a conductor channel 123 (FIG. 4) formed therein of conductive metal which establishes electrical connection to the membrane 117. The membrane 117 has complementary upper and lower lips 125, 127 (FIG. 4) on respective ends thereof which fit into and mate with a respective conductor channel 123 to both establish electrical connection to the membrane 117 and position and hold the membrane 117 in place when the two substrates 115 are bonded together and hermetically sealed with the assistance of bond metal placed in the bond metal trenches 122 between the substrates 115 and the insulation layers 118 as described below. A ledge 131 is further formed on each substrate 115 parallel to the channel 120 in order to provide for membrane thickness and permit some squeezing to hold the membrane 117 in position.

Micromachining techniques have evolved from the microelectronics industry. Both the additive processes of thin film deposition or vapor deposition and the subtractive processes of chemical or plasma etching are appropriate for the manufacture of both the channels and pump. The bulk etching of channels in silicon, quartz, or other suitable substrate, whether semiconductor, metallic, or otherwise, and its fusing to a mirror image wafer is one technique of creating a microperistaltic pump. Surface micromachining may also be deployed where a patterned sacrificial profile of the channel is created over which the actuator and insulation materials are deposited.

Isotropic etching techniques are employed in an illustrative implementation of the micropump to create a smooth, contoured concave channel 120. Once this channel 120 and other grooves 119, 122 and ledges 131 have been created, a metal layer of a few hundred Angstroms (A) in thickness is vapor or sputter deposited evenly over the whole top surface of substrate 115. An even layer of photoresist is then applied and a photo mask is thereafter used to define the etch barriers to form the metal actuator strips 121, leads 142, pads 143, and conductive membrane connection channels 123 (FIG. 5). The comparatively large depth of field required for submicron definition of the actuator elements 121 in the channel 120 requires special care.

Following the etching and removal of the photoresist, a vapor epitaxial deposit of a micron of silicon dioxide, or like insulation material, is required to form the insulation layers 118. The insulation layers 118 provide the insulation between the actuator strips themselves, the insulation between the actuator strips 116 and the membrane 117, and the insulation between the strips 116 and the bond metal to be placed in the bond metal trenches 122.

After annealing the material to consolidate the insulation layer 118, another photoresist coating is applied and then another photo mask in order to define the membrane connection channel 123 and insulation profile, e.g., to expose the conductive strip connection pads 143. The final wafer processing step involves the vapor or sputter deposition of a column of interwafer bond metal in the bond metal trenches 122, for example, utilizing a shadow mask. The pump die shells or substrates 115 are then cut from their wafer, the flexible membrane 117 placed between two shells 115, and the assembly clamped together and placed in an oven until the bond metal melts, pulls the two dies together, and fuses the two dies 115 together to form a solid structure hermetically sealed down both sides by the bond metal, such as illustrated in FIG. 6. A typical bond metal is a mixture of gold and germanium.

Where the membrane 117 is clamped, it is in intimate contact with the thin insulation layer 118 of both shells 115. Hence, when a voltage is applied between an actuator element 121 and the membrane 117, an electrostatic attraction force, proportional to the square of the applied voltage and the inverse square of the insulation thickness (<1 micron), pulls the membrane 117 down. The membrane 117 rolls down the surface 144 of the insulation (FIG. 6), due to the fact that the greatest attractive forces are generated where distances from conductive strips 121 are the smallest (ie. insulation thickness). Conversely, when a voltage is applied to the strip 121 in the upper shell 115, the membrane 117 rolls up its channel surface 145. As seen in the cross-sectional view down the channel of FIG. 8, when a neighboring conducting strip 121 is energized the membrane 117 rolls forward (FIG. 8) and down across the activated elements. The membrane 117 is initially drawn up onto the upper channel surface 145 (FIG. 9) and advanced along the channel 120, then the membrane 117 is released for several periods (zeros) before the membrane 117 is drawn down into the lower channel 120 and then rolls down the lower channel surface 144. Thus, a membrane "wall" is placed across the composite channel. By connecting the actuator elements 121 up to the outputs of a shift register vial leads 142 and pads 143, a clocked bit stream of "1s" or "0s" apply a voltage or no voltage with respect to the membrane 117, respectively, to the actuator elements 121 along the channel 120 in a sequential manner. This actuation progression provides a miniature peristaltic pump.

Figure 10:
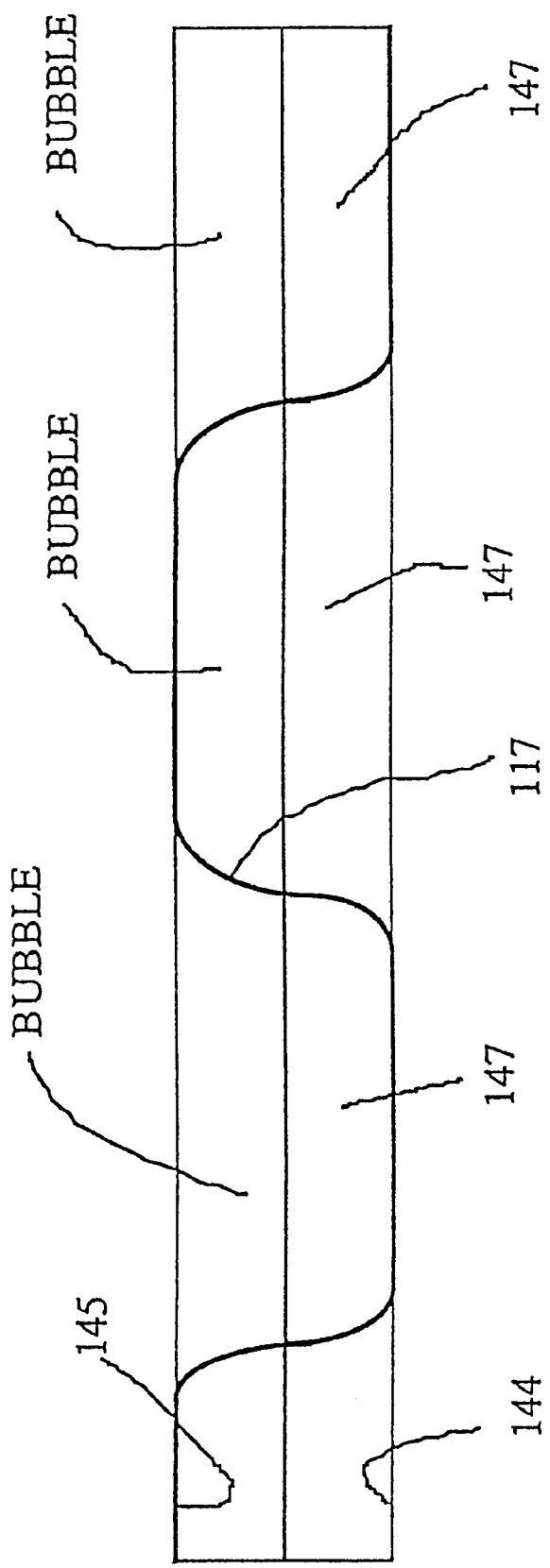
FIG. 10 is a partial side sectional view of a micropump channel according to the second preferred embodiment.

In the case of the preferred embodiment of a dual channeled pump, dual shift registers are required where the bit streams are interlaced and interlocked such that a membrane wall is advanced down channel. By alternate inversions of the bit streams sequences, multiple membrane "bubbles" 147 will move down the channel (FIG. 10), pushing the entrapped fluid in front of each membrane "wall" and pulling the fluid behind each membrane "wall." To reduce the propensity for fatigue, the membrane needs to be sufficiently elastomeric to prevent crinkling during the 3D surface distortion occurring in concave-convex or convex-flat transitions. The electrical conductivity of the impregnated membrane or surface coated membrane needs to be maintained, albeit increasing somewhat, through elastomeric extension.

This disclosed pump architecture represents a true two-dimensional analog of the three-dimensional peristaltic mechanisms that are endemic in living organisms. It is valveless and impervious to gas bubble entrapment that has plagued other attempts at miniature pumps. It also does not require priming and can tolerate the adherence of small foreign articles (small compared with cavity dimensions) on channel or membrane surfaces. The pump is self-purging, tending to push everything before the membrane 117 in its intimate rolling motion across the channel surface. Its performance is gracefully degraded by the adherence of small foreign particles, with the membrane 117 still progressing along the channel 120, but with less attractive force when across the particle due to the greater distance of that portion of the membrane 117 from the underlying conductive strip 121.

Figure 17:
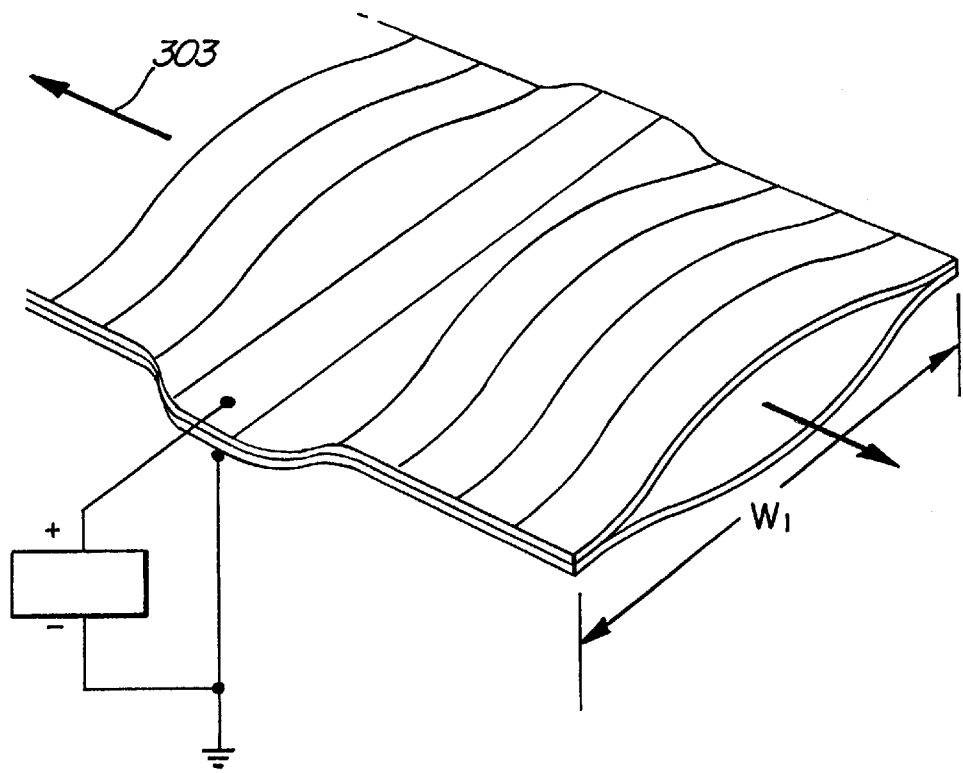
FIG. 17 is a perspective view of a flexible tube embodiment employing an electret for channel closure.

FIGS. 11 and 12 illustrate a peristaltic pump 220 employing flexible tubing as opposed to fabrication on a solid substrate. The pump 220 includes first and second flexible membranes or walls 211, 213. The two membranes 211, 213 are attached at their respective edges 221, 223 such that a fluid-tight seal is achieved all along such edges 221, 223, thus creating a central channel 212 between the membranes 211, 213. Various channel dimensions are possible, an exemplary one being 1 centimeter in length along the longitudinal axis 303 (FIG. 17) and 2 millimeters in width $W_1$ (FIG. 17).

Electrically conductive strips 217 are laid out on one of the respective exterior surfaces of the flexible membranes 211 in sequential fashion similar to conductors 121 of FIG. 5. The other exterior surface 213 includes a conductive layer 219 which is a continuous, i.e., not partitioned into strips. Thus, exterior surface 213 is similar to a ground plane. The conductors 217 and conductor surface 219 include portions or leads extending beyond the membrane to facilitate electrical contact therewith.

In order to facilitate pumping of aqueous liquids or moist vapors, a monolayer 215 of hydrophobic material may be applied to the interior surfaces of the membranes 211, 213. Sequential application of voltage to the conductor strips 217 draws or pinches the flexible membranes 211, 213 together sequentially so as to cause the region of closure between the membrane structures to move or progress down the central channel 212, thereby creating a peristaltic pumping action.

Figure 13:
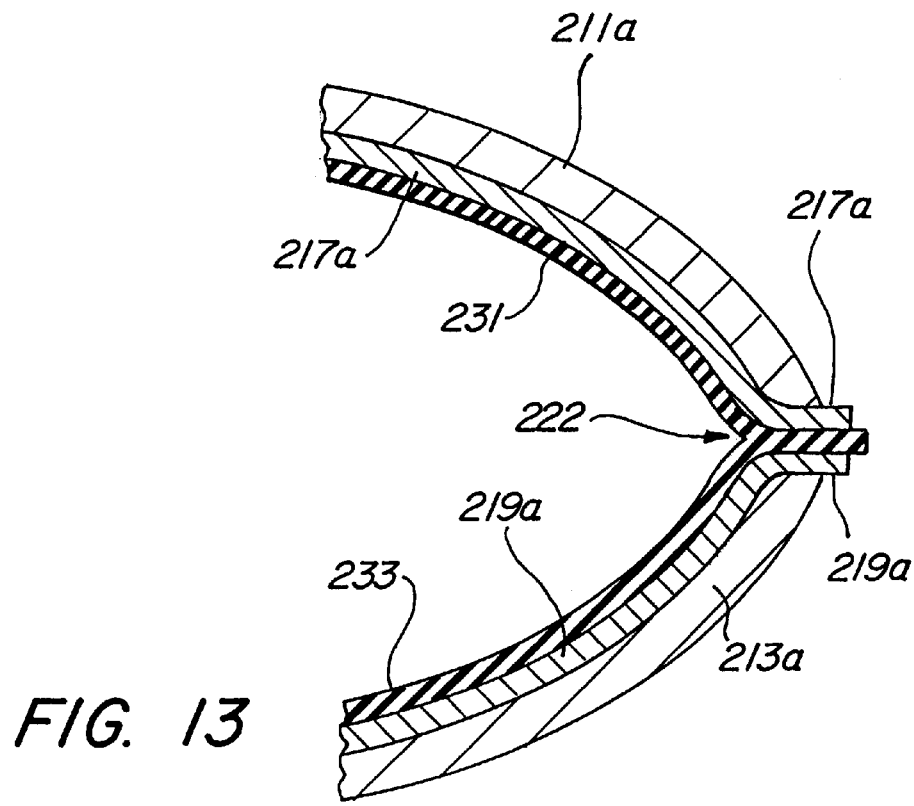
FIG. 13 is a partial schematic cross-sectional view illustrating an alternate flexible tube pump embodiment.

FIG. 13 illustrates an alternate and more preferred embodiment wherein opposite conductor strips 217a and conductive layer 219a are applied to the respective interior surfaces of two oppositely disposed flexible membranes 211a, 213a, at least one of them covered with a suitable thin insulation layer 231 or 233.

The surface of the two membrane walls 211, 213; 211a, 213a must be in intimate contact at the edges 221, 223 of the channel 212 to ensure high electrostatic fields in the "nip" areas 222. When assembling with adhesives such as super glue or by thermal welding, there can be no buildup or beaded material in the nip areas 222.

The conductors 217, 219; 217a, 219a may be formed by conventional deposition procedures, including metal sputtering and spraying, spin coating or printing of electrically conductive polymers, on the flexible membrane 211, 213; 211a, 213a and need to be covered with a thin insulation layer (FIG. 13) or, in the case of extremely thin membranes, may be located on the "outside" of the membrane wall (FIG. 11). Suitable conductor materials include gold, aluminum or copper. Flexible walls or membranes may be constructed of various thin elastic insulating materials such as polyurethane, Kevlar, Kapton, Teflon or Mylar.

Figure 14:
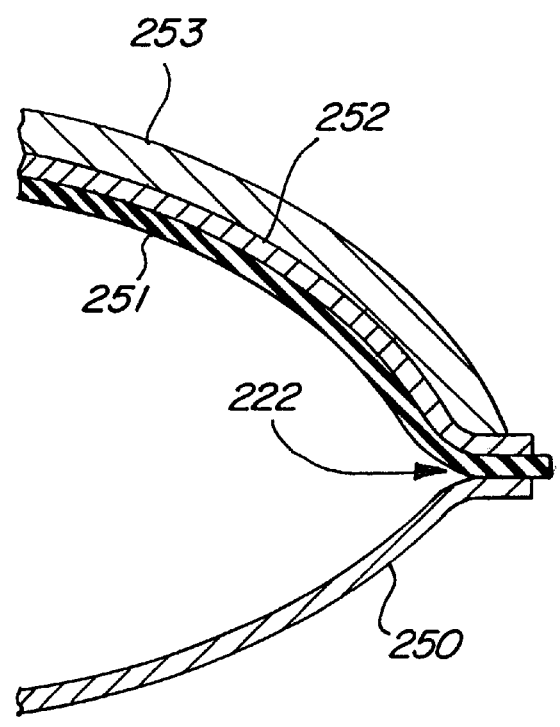
FIG. 14 is a partial schematic cross-sectional view illustrating an alternate flexible tube pump embodiment.

In the embodiment illustrated in FIG. 14, lower wall 250 is a thin, flexible conductive metal foil or a conductive mesh cloth or conductive mat. Upper outer wall 253 is a flexible membrane (insulator), onto which an inner conductive layer of partitioned actuator strips 252 and inner insulator layer 251 have been applied. The various flexible membrane walls of embodiments like FIG. 11, e.g., 211, 213, may be one or two microns thick. The membranes, e.g., 253, may be thicker in embodiments according to FIG. 13. It is preferable to make insulator layers which separate opposite conductive layers as thin as possible to increase the attractive forces between opposing sides of the pump. Thus, membrane walls 211, 213 in an embodiment like FIG. 11 are desirably as thin as possible.

The embodiments of FIGS. 11–14 generally illustrate a peristaltic pump construction wherein two walls or surfaces are moveably related to one another. A peristaltic action is achieved by a means for generating forces that move the opposing surfaces of the two walls relative to one another. Such forces are a function of the distance (d) between the conducting electrodes on the two walls and are proportional to $1/d^2$. Such forces may be electron, magnetic dipole or electromagnetic in nature, and the energy for these forces may be derived photovoltaically, electrochemically, thermoelectrically, electromechanically or atomically. The two walls may be one continuous surface in the form of a crimped cylinder or formed from two or more surfaces joined together by adhesive, seam, butt or lath welding.

Figure 15:
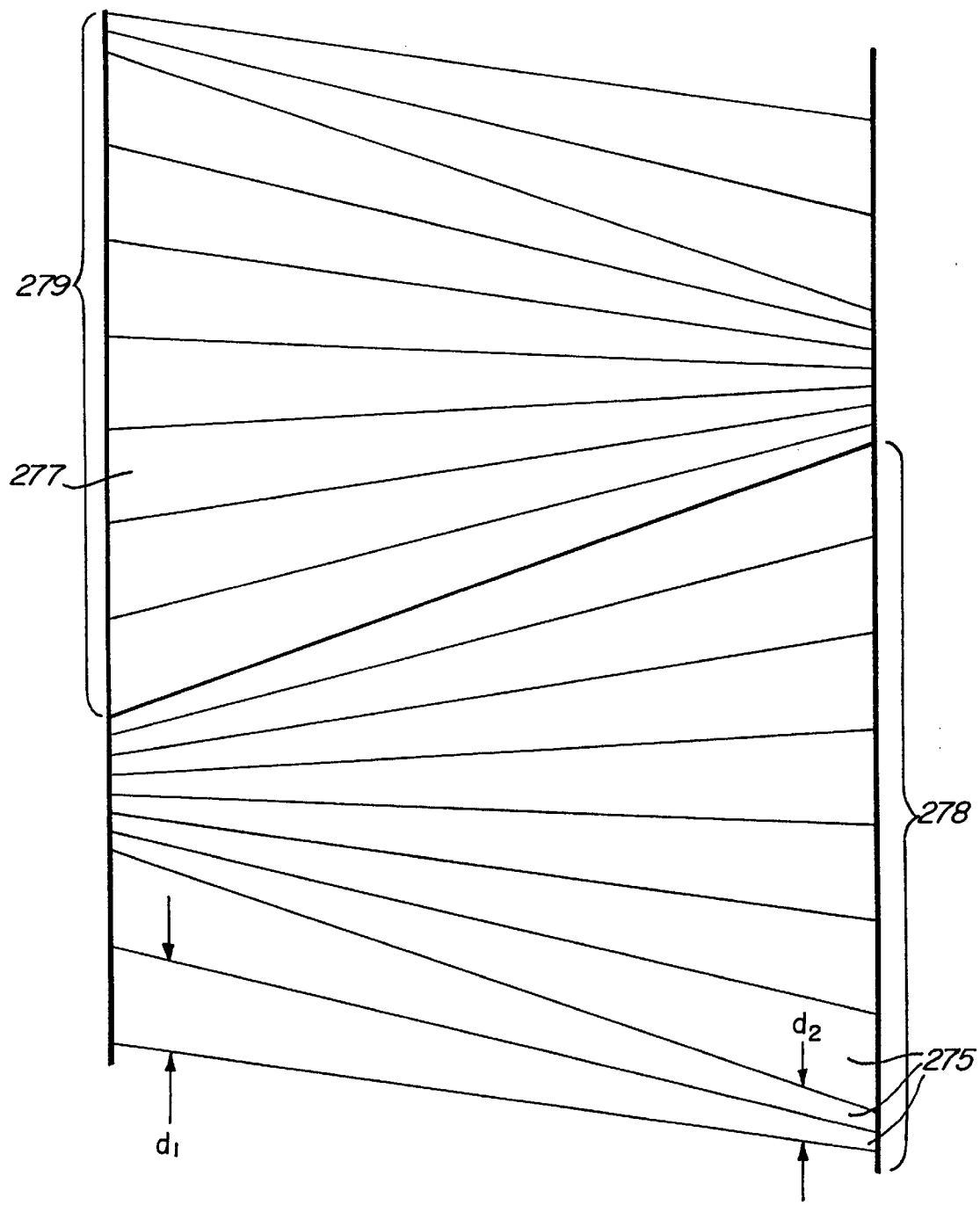
FIG. 15 is a top view of a wedge-shaped conductor pattern for achieving a fishtail pumping action.

Flexible walled pumps according to the preferred embodiments thus exhibit locomotion and thus may themselves "crawl" across a surface. Such locomotion may be either axial (earthworm), as may be accomplished with the embodiment illustrated in FIG. 12, or "fishtail" as will now be discussed in connection with FIG. 15. In FIG. 15, the successive partitioned conductors 275, 277 are not rectangular, but rather are triangular or wedge shaped as shown. The underlying tube is thus pinched together asymmetrically. That is, for example, when the first wedge conductor 275 in a first fishtail section 278 is activated, the tube is pinched together along an area of relatively large width "$d_1$" on one side and a relatively small width "$d_2$" on the other. Activation of a conductor 277 in the next fishtail section 279 causes the same effect on the opposite side of the tube.

Figure 16:
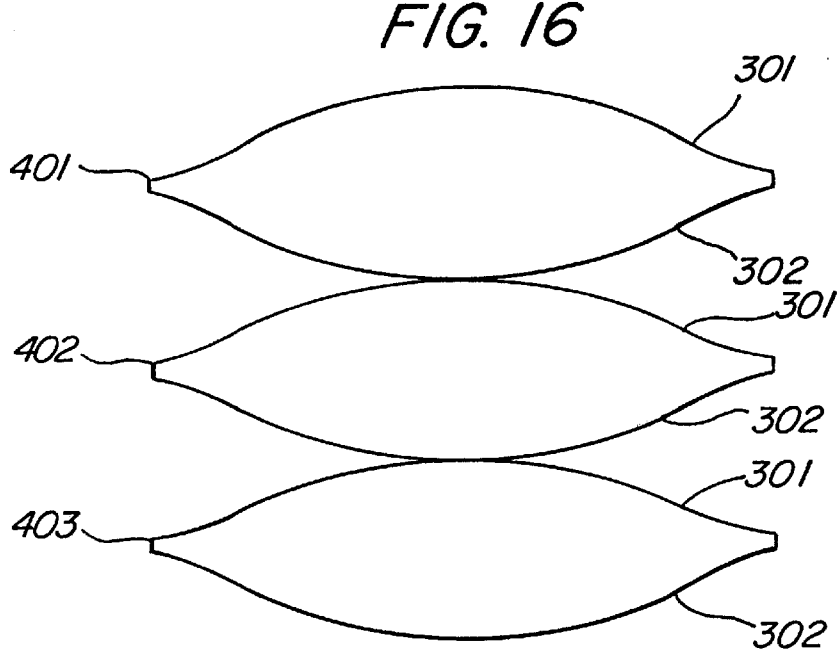
FIG. 16 is a schematic cross-sectional diagram illustrating a stacked flexible tube pump structure.

Multiple layered structures may also be created, i.e., one dual walled tube stacked or laminated on another, as shown in FIG. 16, where opposite flexible membranes 301, 302 create a structure of three stacked pumps 401, 402, 403. Each pump 401, 402, 403 may be independently activated, thus resulting in three independent pumps. Such layered pumps may thus "pump" multiple fluids. The peristaltic progression rates of each pump in such a multiple channel membrane sandwich can be independent and there is no need for the volumes of the respective tubes to be the same. Hence, the flow rates, or volume ratios if fluids are subsequently combined, of various fluids can be continuously varied or fixed respectively. In the push-pull pump of FIG. 4, one can have a different fluid on either side of the membrane and equal volumes pumped down, i.e., 50/50 ratio. With the flexible tube embodiments of FIGS. 11–16, various pumps in a layered or other structure do not have to be of the same width or clocked at the same rate.

The pumps illustrated in FIGS. 11–16 are particularly useful as "one-shot" devices, e.g., to eject a measured dose of fluid or drugs. In a closed loop system, upstream pressure can be used to reopen the devices. Otherwise, the generally "floppy" thin membrane material will not automatically reopen without provision of some resilient internal structure.

It is believed that an electrostatic peristaltic pump according to the preferred embodiment can function with fluids that are both electrically conductive and nonconductive. If electrically conductive fluids present a problem, then magnetic renditions might be considered, but these would be more complex, require significantly greater amounts of power, and function over a more restrictive temperature range.

Permanently charged polarized surface electrets (electrical analog of permanent magnets) produce a permanent voltage capable of providing the "normally closed" sealing of a tube (valve) or push-pull peristaltic pump, as illustrated in FIG. 17. The "valve" is opened by application of sufficient alternate bias voltage to neutralize the electret voltage and associated electrostatic field.

The disclosed pumps have a number of advantages. At micron dimensions small voltages create high electric fields over small distances which, in turn, are capable of generating substantial electrostatic forces. Electrostatic actuators consume no power (fractions of $\mu$W at high frequencies) and function from absolute zero to the eutectic melting temperatures of the interwafer bonding materials.

As discussed in application Ser. No. 08/512,186, several applications for microperistaltic pumps according to the preferred embodiment have been identified, specifically: low differential pressure gas pump, forced convective transfer heat exchanger, pneumatic turbine compressor, vacuum pump, fluid pumps, heat pipe (thermal mass transfer), compressor for phase interchange heat pump/refrigerator, low vibration cryogenic fluid pump, fluidic reaction wheel, and high pressure valve.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A microminiature pump structure forming at least part of a microminiature pump, said pump structure comprising;
    a flexible membrane;
    means attached to said membrane for forming a fluid-tight channel therewith; and
    means for attracting said membrane into said channel so as to close a region of said channel and for causing the closed region of said channel to move down said channel so as to create a pumping action.

2. The structure of claim 1 wherein said means for forming comprises a second flexible membrane.

3. The structure of claim 2 wherein said means for attracting includes a series of conductor strips formed on a surface of one of said flexible membranes.

4. The structure of claim 3 wherein said surface is an exterior surface.

5. The structure of claim 3 wherein said surface is an interior surface.

6. The structure of claim 3 wherein said means for attracting further includes a continuous conductive surface formed on a surface of the other of said flexible membranes.

7. The structure of claim 2 wherein said second flexible membrane comprises a flexible conductive metal foil.

8. The structure of claim 3 wherein each of said conductive strips is rectangular.

9. The structure of claim 3 wherein each of said conductor strips is wedge-shaped such that said one membrane is pulled together more on one side than the other upon activating a said conductor strip so as to effect a fishtail traveling compression of said channel.

10. The structure of claim 6 wherein said surface of the other of said flexible membranes is an interior surface.

11. The structure of claim 6 wherein said surface of the other of said flexible membranes is an exterior surface.

12. A stack of pump structures, each pump structure comprising at least part of a respective pump, each pump structure comprising:
    a flexible membrane;
    means attached to said membrane for forming a fluid-tight channel therewith; and
    means for attracting said membrane into said channel so as to close a region of said channel and for causing the closed region of said channel to move down said channel so as to create a pumping action.

13. The structure of claim 12 wherein said means for forming comprises a second flexible membrane.

14. The structure of claim 13 further including a series of conductor strips formed on a surface of one of said flexible membranes.

15. The structure of claim 14 wherein said surface is an exterior surface.

16. The structure of claim 14 wherein said surface is an interior surface.

17. The structure of claim 14 further including a continuous conductive surface found on a surface of a second of said flexible membranes.

18. The pump structure of claim 13 wherein said second flexible membrane comprises a flexible conductive metal foil.

19. The structure of claim 14 wherein said conductive strips are each rectangular.

20. The structure of claim 1 further including a hydrophobic layer applied to the interior of said channel.

21. A microminiature pump structure forming at least part of a microminiature pump, said pump structure comprising:
   a first flexible membrane;
   means including a second flexible membrane attached to said first membrane for forming a fluid-tight channel therewith; and
   means for attracting said first and second membrane toward one another so as to close a region of said channel and for causing the closed region of said channel to move down said channel so as to create a pumping action.

22. The pump structure of claim 1 wherein said membrane comprises an elastomeric non-crinkling material.

23. The pump structure of claim 1 further including means for maintaining a portion of said channel in a normally closed state.

24. The pump structure of claim 23 wherein said means comprises an electret.

25. A microminiature tube structure comprising:
   a first flexible membrane;
   means including a second flexible membrane attached to said first membrane for forming a fluid-tight channel therewith; and
   means for attracting said first and second membranes toward one another so as to close a region of said channel and for causing the closed region of said channel to move down said channel so as to cause said tube structure to move over a surface.

26. A microminiature pump structure forming at least part of a microminiature pump, said pump structure comprising:
   a fluid tight channel including a flexible membrane; and
   means for attracting said membrane into said channel so as to close a region of said channel and for causing the closed region of said channel to move down said channel so as to create a pumping action.

27. The structure of claim 26 wherein said fluid tight channel comprises a second flexible membrane.

28. The structure of claim 27 wherein said means for attracting includes a series of conductor strips formed on a surface of one of said flexible membranes.

29. The structure of claim 28 wherein said surface is an exterior surface.

30. The structure of claim 28 wherein said surface is an interior surface.

31. The structure of claim 28 wherein said means for attracting further includes a continuous conductive surface formed on a surface of the other of said flexible membranes.

32. The structure of claim 27 wherein said second flexible membrane comprises a flexible conductive metal foil.

33. The structure of claim 28 wherein each of said conductive strips is rectangular.

34. The structure of claim 28 wherein each of said conductor strips is wedge-shaped such that said one of said flexible membranes is pulled together more on one side than the other upon activating a said conductor strip so as to effect a fishtail traveling compression of said channel.

35. The structure of claim 31 wherein said surface of the other of said flexible membranes is an interior surface.

36. The structure of claim 31 wherein said surface of the other of said flexible membranes is an exterior surface.

37. The pump structure of claim 27 wherein said first and second flexible membranes form a flexible tube.

* * * * *